US011901637B2

(12) United States Patent
Jia

(10) Patent No.: US 11,901,637 B2
(45) Date of Patent: Feb. 13, 2024

(54) MILLIMETER WAVE MODULE AND ELECTRONIC DEVICE

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 382 days.

(21) Appl. No.: 17/359,981

(22) Filed: Jun. 28, 2021

(65) Prior Publication Data

US 2021/0328364 A1 Oct. 21, 2021

Related U.S. Application Data

(63) Continuation of application No. PCT/CN2020/079162, filed on Mar. 13, 2020.

(30) Foreign Application Priority Data

Mar. 20, 2019 (CN) ........................ 201910211082.7

(51) Int. Cl.
*H01Q 21/24* (2006.01)
*H01Q 5/42* (2015.01)
(Continued)

(52) U.S. Cl.
CPC ............... *H01Q 21/24* (2013.01); *H01Q 5/42* (2015.01); *H01Q 9/0435* (2013.01); *H01Q 21/08* (2013.01)

(58) Field of Classification Search
CPC ...... H01P 3/16; H01P 3/10; H01P 1/16; H01P 5/08; H01P 5/087; H01P 3/06;
(Continued)

(56) References Cited

U.S. PATENT DOCUMENTS

2015/0226846 A1 8/2015 Tedeschi
2019/0020114 A1* 1/2019 Paulotto .................. H01Q 9/40
(Continued)

FOREIGN PATENT DOCUMENTS

CN 101170214 A 4/2008
CN 106887722 A 6/2017
(Continued)

OTHER PUBLICATIONS

The first office action issued in corresponding CN application No. 201910211082.7 dated Jan. 20, 2021.
(Continued)

*Primary Examiner* — Monica C King
(74) *Attorney, Agent, or Firm* — PERKINS COIE LLP

(57) ABSTRACT

A millimeter wave module and an electronic device are provided herein. The millimeter wave module includes an antenna substrate and an antenna array. The antenna substrate has a first direction and a second direction perpendicular to each other. The antenna array is located on the antenna substrate. The antenna array includes a plurality of dual-polarized antenna array elements for radiating millimeter wave signal. At least one of the dual-polarized antenna array elements is configured to the radiate millimeter wave signal in a first radiation mode when being fed in the first direction, and radiate the millimeter wave signal in a second radiation mode when being fed in the second direction.

19 Claims, 5 Drawing Sheets

(51) Int. Cl.
*H01Q 9/04* (2006.01)
*H01Q 21/08* (2006.01)

(58) Field of Classification Search
CPC .... H01P 5/103; H01P 5/02; H01P 3/12; H01P 3/122; H01P 5/00; H01P 11/006; H01P 3/127; H01P 5/12; H01P 1/042; H01P 1/10; H01P 1/207; H01P 5/026; H01P 1/00; H01P 1/02; H01P 1/064; H01P 3/00; H01P 5/18; H01P 5/188; H01P 5/19; H01P 7/06; H01P 1/04; H01P 1/182; H01P 1/2138; H01P 1/22; H01P 1/222; H01P 1/30; H01P 11/002; H01P 3/02; H01P 3/08; H01P 5/024; H01P 5/028; H01P 5/04; H01P 5/085; H01P 5/10; H01P 5/107; H01P 7/08; H01Q 1/46; H01Q 13/24; H01Q 13/02; H01Q 9/0485; H01Q 1/38; H01Q 13/06; H01Q 21/064; H01Q 21/24; H01Q 1/243; H01Q 19/08; H01Q 21/065; H01Q 1/2283; H01Q 1/246; H01Q 25/001; H01Q 1/2291; H01Q 1/50; H01Q 9/0407; H01Q 21/205; H01Q 3/24; H01Q 1/36; H01Q 9/0414; H01Q 1/48; H01Q 13/18; H01Q 15/08; H01Q 21/08; H01Q 9/0435; H01Q 13/106; H01Q 13/26; H01Q 19/062; H01Q 21/245; H01Q 13/10; H01Q 13/20; H01Q 21/062; H01Q 3/26; H01Q 3/34; H01Q 3/36; H01Q 1/24; H01Q 1/526; H01Q 13/08; H01Q 13/206; H01Q 15/14; H01Q 15/24; H01Q 21/00; H01Q 25/007; H01Q 3/08; H01Q 3/245; H01Q 3/247; H01Q 3/30; H01Q 5/47; H01Q 9/0457; H01Q 9/28; H01Q 9/285; H01Q 1/3233; H01Q 1/40; H01Q 1/523; H01Q 13/025; H01Q 15/02; H01Q 21/0006; H01Q 21/0031; H01Q 21/0037; H01Q 21/0087; H01Q 21/061; H01Q 21/22; H01Q 21/29; H01Q 3/22; H01Q 3/242; H01Q 9/065; H01Q 1/1228; H01Q 1/1242; H01Q 1/2266; H01Q 1/52; H01Q 11/105; H01Q 13/22; H01Q 13/28; H01Q 15/002; H01Q 15/0086; H01Q 19/005; H01Q 19/24; H01Q 21/0043; H01Q 21/005; H01Q 21/0093; H01Q 21/06; H01Q 21/067; H01Q 21/20; H01Q 21/26; H01Q 21/28; H01Q 25/002; H01Q 25/04; H01Q 3/2605; H01Q 3/38; H01Q 3/46; H01Q 5/10; H01Q 5/22; H01Q 5/25; H01Q 5/378; H01Q 5/385; H01Q 5/42; H01Q 9/0442; H01Q 9/40; H01Q 1/02; H01Q 1/20; H01Q 1/22; H01Q 1/241; H01Q 1/3208; H01Q 1/3275; H01Q 1/364; H01Q 1/42; H01Q 1/422; H01Q 1/44; H01Q 1/525; H01Q 11/08; H01Q 11/083; H01Q 13/00; H01Q 13/0241; H01Q 13/085; H01Q 13/103; H01Q 15/0026; H01Q 15/0066; H01Q 15/04; H01Q 15/12; H01Q 15/16; H01Q 15/242; H01Q 19/06; H01Q 19/09; H01Q 19/108; H01Q 19/19; H01Q 19/193; H01Q 19/28; H01Q 21/0012; H01Q 21/0025; H01Q 21/0068; H01Q 21/0075; H01Q 25/00; H01Q 25/008; H01Q 25/02; H01Q 3/12; H01Q 3/18; H01Q 3/2658; H01Q 3/2676; H01Q 3/44; H01Q 3/446; H01Q 5/307; H01Q 5/45; H01Q 5/55; H01Q 9/04; H01Q 9/045; H01Q 9/26; H05K 2201/0723; G01S 13/931; G01S 13/04; G01S 7/032; G01S 13/34; G01S 13/42; G01S 13/726; G01S 13/74; G01S 13/865; G01S 13/867; G01S 13/88; G01S 13/89; G01S 2013/0254; G01S 2013/9316; G01S 2013/932; G01S 2013/9322; G01S 2013/93271; G01S 7/024; G01S 7/025; G01S 7/03; G01S 7/4056; G01S 7/411; G01S 7/415; G01S 7/417; H04B 3/52; H04B 3/54; H04B 3/56; H04B 3/36; H04B 3/58; H04B 7/04; H04B 2203/5441; H04B 2203/5479; H04B 3/46; H04B 2203/5425; H04B 7/15507; H04B 5/0018; H04B 7/155; H04B 2203/5483; H04B 3/542; H04B 1/40; H04B 10/40; H04B 17/318; H04B 2203/5458; H04B 3/38; H04B 1/00; H04B 10/25752; H04B 10/25759; H04B 15/04; H04B 2203/5445; H04B 2203/5487; H04B 2203/5495; H04B 5/0012; H04B 1/3827; H04B 17/345; H04B 2203/5466; H04B 3/00; H04B 3/50; H04B 3/546; H04B 7/022; H04B 7/0482; H04B 7/0617; H04B 7/0639; H04B 7/15542; H04B 7/2612; H04B 1/0057; H04B 10/2581; H04B 10/90; H04B 15/00; H04B 3/03; H04B 5/0031; H04B 5/005; H04B 5/0075; H04B 7/01; H04B 1/04; H04B 1/0475; H04B 1/16; H04B 1/38; H04B 10/25753; H04B 10/29; H04B 14/02; H04B 15/02; H04B 17/0085; H04B 17/23; H04B 2203/5408; H04B 2203/5433; H04B 3/02; H04B 3/06; H04B 3/32; H04B 5/0037; H04B 7/024; H04B 7/0613; H04B 7/14; H04B 1/0064; H04B 1/1027; H04B 1/50; H04B 10/038; H04B 10/0799; H04B 17/102; H04B 17/103; H04B 17/17; H04B 17/27; H04B 17/3911; H04B 17/408; H04B 2203/5437; H04B 2203/5491; H04B 3/04; H04B 3/21; H04B 3/28; H04B 3/544; H04B 5/00; H04B 5/0062; H04B 7/0413; H04B 7/0495; H04B 7/0691; H04B 7/0831; H04B 7/10; H04B 7/145; H04B 7/15; H04B 7/15528; H04B 7/15557; H04B 7/15592; H04B 7/18506; H04B 7/18513; H04B 7/18515; H04B 7/2606

See application file for complete search history.

(56) References Cited

U.S. PATENT DOCUMENTS

| | | | | |
|---|---|---|---|---|
| 2020/0052416 | A1 | 2/2020 | Yong et al. | |
| 2020/0091608 | A1* | 3/2020 | Alpman | H01Q 25/001 |
| 2020/0203804 | A1* | 6/2020 | Khripkov | H01Q 13/10 |
| 2020/0388924 | A1* | 12/2020 | Lee | H01Q 9/045 |

FOREIGN PATENT DOCUMENTS

| | | | |
|---|---|---|---|
| CN | 107394381 | A | 11/2017 |
| CN | 107453035 | A | 12/2017 |
| CN | 108767437 | A | 11/2018 |
| CN | 109037930 | A | 12/2018 |
| CN | 109066063 | A | 12/2018 |

(56) References Cited

FOREIGN PATENT DOCUMENTS

| | | | |
|---|---|---|---|
| CN | 109066065 | A | 12/2018 |
| CN | 109103589 | A | 12/2018 |
| EP | 3641060 | A1 | 4/2020 |
| WO | 2018206116 | A1 | 11/2018 |
| WO | 2018230039 | A1 | 12/2018 |

OTHER PUBLICATIONS

International search report issued in corresponding international application No. PCT/CN2020/079162 dated Jun. 4, 2020.
The second office action issued in corresponding CN application No. 201910211082.7 dated Jun. 17, 2021.
Bairavasubramanian R et al: 3-D-Integrated RF and Millimeter-Wave Functions and Modules Using Liquid Crystal Polymer (LCP) System-on-Package Technology, dated May 1, 2004. pp. 332-340.
Jianfeng Zhu et al: Cavity-backed high-gain switch beam antenna array for 60-GHz applications, dated Aug. 28, 2017. pp. 1776-1781.
Extended European search report issued in corresponding European application No. 20773299.1 dated Jan. 11, 2022. 10 pages.

* cited by examiner

MILLIMETER WAVE MODULE AND ELECTRONIC DEVICE

CROSS-REFERENCE TO RELATED APPLICATIONS

This application is a continuation application of International Patent Application No. PCT/CN2020/079162, filed on Mar. 13, 2020, which claims the benefit of priority to Chinese Patent Application No. 201910211082.7, filed on Mar. 20, 2019, the contents of both applications are hereby incorporated by reference in their entireties.

TECHNICAL FIELD

The present application relates to the field of communication technology, and in particular, to a millimeter wave module and an electronic equipment.

BACKGROUND

The statements here only provide background information related to the present disclosure, and do not necessarily constitute prior art.

Millimeter Wave ("Mm-wave") is an electromagnetic wave between microwaves and light waves. Generally, the frequency band of the millimeter wave refers to 30-300 GHz, and the corresponding wavelength is 1-10 mm. The millimeter wave can provide a relatively wide frequency band. With the rapid growth of the amount of information, the amount of flow transmitted will also increase. The transmission technology of the millimeter-wave spectrum has been regarded as one of communication technologies with high-quality transmission capabilities.

SUMMARY

According to embodiments of the present disclosure, a millimeter wave module and an electronic device are provided.

In some embodiments, the millimeter wave module can include an antenna substrate and an antenna array.

The antenna substrate can include a first direction and a second direction perpendicular to each other.

The antenna array is located on the antenna substrate. The antenna array can include a plurality of dual-polarized antenna array elements for radiating millimeter wave signal. At least one of the dual-polarized antenna array elements is configured to the radiate millimeter wave signal in a first radiation mode when being fed in the first direction, and radiate the millimeter wave signal in a second radiation mode when being fed in the second direction. The first radiation mode is different from the second radiation mode.

In some embodiments, the electronic device can include a housing and the millimeter wave module. The millimeter wave module is accommodated in the housing.

The details of one or more embodiments of the present disclosure are set forth in the following drawings and description. Other features, objectives and advantages of the present disclosure will become apparent from the description, drawings and claims.

BRIEF DESCRIPTION OF THE DRAWINGS

To illustrate the technical solutions in the embodiments of the present disclosure more clearly, the following will briefly describe the accompanying drawings required for describing the embodiments or the prior art. Obviously, the accompanying drawings in the following description show merely some embodiments of the present disclosure. For person skilled in the art, other drawings can derive other drawings from these accompanying drawings without creative efforts.

DETAILED DESCRIPTION

In order to make the objectives, technical solutions, and advantages of the present disclosure clearer, the following further describes the present disclosure in detail with reference to the accompanying drawings and embodiments. It should be understood that the specific embodiments described here are only used to explain the present disclosure, and are not used to limit the scope of the present disclosure.

It can be understood that the terms "first" "second" etc. used in the present disclosure can be used herein to describe various elements, but these elements are not limited by these terms. These terms are only used to distinguish the first element from another element. For example, without departing from the scope of the present disclosure, the first area may be referred to as the second area, and similarly, the second area may be referred to as the first area. Both the first area and the second area are areas, but they are not the same area.

It should be noted that when an element is referred to as being "disposed on" another element, it can be directly on the other element or a central element may also be present. When an element is considered to be "connected" to another element, it can be directly connected to the other element or an intermediate element may be present at the same time.

A millimeter wave module according to an embodiment of the present disclosure can be applied to an electronic device. The electronic device includes a rear case. In an embodiment, the electronic device may include a mobile phone, a tablet computer, a notebook computer, a handheld computer, a mobile Internet device (MID), a wearable device (such as a smart watch, a smart bracelet, a pedometer, etc.) or other communication modules that can be equipped with the millimeter wave module.

Figure 1:
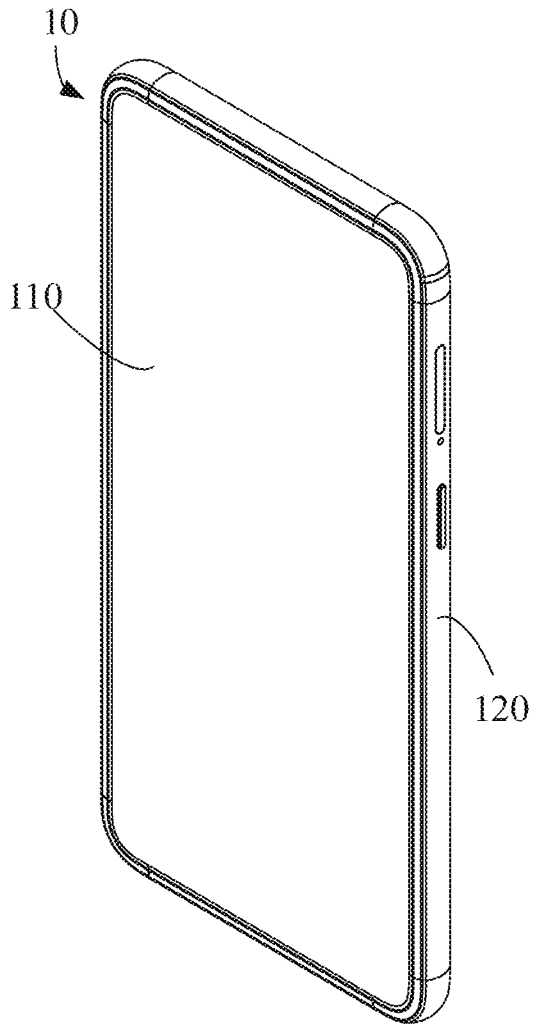
FIG. 1 is a perspective view of an electronic device according to an embodiment of the present disclosure.

As illustrated in FIG. 1, according to an embodiment of the present disclosure, the electronic device 10 can include a display screen assembly 110, a housing assembly 120, and a controller. The display screen assembly 110 is fixed on the housing assembly 120 and forms an external structure of the electronic device together with the housing assembly 120. The housing assembly 120 can include a middle frame and a back cover. The middle frame may be a frame structure with a through hole. In some embodiments, the middle frame can be accommodated in an accommodating space formed by the display screen assembly and the back cover. The back cover is used to form the outer contour of the electronic device. The back cover can be formed by one-piece molding. During a molding process of the back cover, a rear camera hole, a fingerprint recognition module, a mounting hole of an antenna device, and other structures can be formed on the back cover. In some embodiments, the back cover may be a non-metal back cover. For example, the back cover may be a plastic back cover, a ceramic back cover, a 3D glass back cover, etc. The controller can control operation of the electronic device and so on. The display screen assembly can be configured to display pictures or fonts, and can provide an operation interface for users.

According to an embodiment, the millimeter wave module is integrated in the housing assembly 120. The millimeter wave module can transmit and receive a millimeter wave signal through the housing assembly 120, so that the electronic device can have a wide coverage of millimeter wave signal.

Millimeter waves refer to electromagnetic waves with wavelengths on the order of millimeters. The frequency approximately ranges from 20 GHz to 300 GHz. 3GPP has designated a list of frequency bands supported by 5G NR, and the 5G NR spectrum range can reach 100 GHz, and 3GPP has designated two frequency ranges: Frequency range 1 (FR1), which is the frequency band below 6 GHz, and Frequency range 2 (FR2), which is the millimeter wave frequency band. The frequency range of the frequency range 1: 450 MHz-6.0 GHz, and the maximum channel bandwidth is 100 MHz. The frequency range of the frequency range 2 is 24.25 GHz-52.6 GHz, and the maximum channel bandwidth is 400 MHz. The near 11 GHz spectrum for 5G mobile broadband includes: 3.85 GHz licensed spectrum, for example, 28 GHz (24.25-29.5 GHz), 37 GHz (37.0-38.6 GHz), 39 GHz (38.6-40 GHz), and 14 GHz unlicensed spectrum (57-71 GHz). The working frequency band of the 5G communication system includes three frequency bands: 28 GHz, 39 GHz and 60 GHz.

Figure 2:
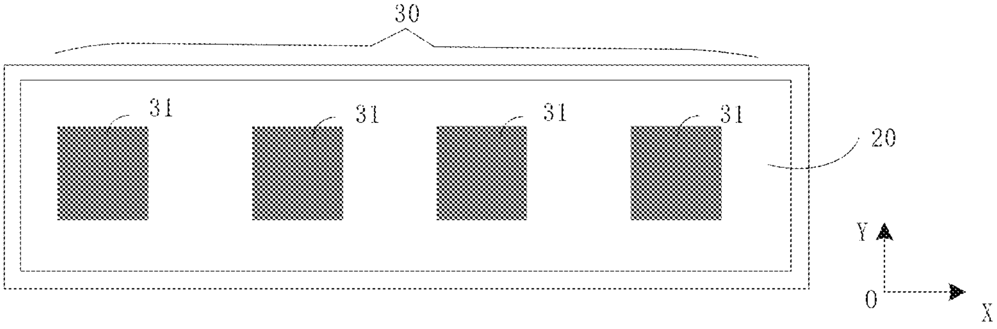
FIG. 2 is a schematic diagram of the structure of a millimeter wave module according to an embodiment of the present disclosure.

As illustrated in FIG. 2, according to an embodiment, the millimeter wave module includes an antenna substrate 20. The antenna substrate 20 extends along a first direction X and a second direction Y which are substantially perpendicular to each other. In some embodiments, a dimension of the antenna substrate 20 along the first direction X is larger than a dimension along the second direction Y.

An antenna array 30 is arranged on the antenna substrate 20. The antenna array 30 includes a plurality of dual-polarized antenna array elements 31 for radiating millimeter wave signal. When being fed in the first direction X, the dual-polarized antenna array element 31 radiates the millimeter wave signal in a first radiation mode. When being fed in the second direction Y, the dual-polarized antenna array element 31 radiates the millimeter wave signal in a second radiation mode.

The first radiation mode may be a patch radiation mode. The second radiation mode may be a substrate integrated waveguide radiation mode. In the present disclosure, specific types of the first radiation mode and the second radiation mode are not limited. It is sufficient for at least one of the dual-polarized antenna array elements to be configured that the first radiation mode in the first direction is different from the second radiation mode in the second direction.

When the dual-polarized antenna array element 31 is fed in the first direction X, the dual-polarized antenna array element 31 radiates the millimeter wave signal in the first radiation mode, and when the dual-polarized antenna array element 31 is fed in the second direction Y, the dual-polarized antenna array element 31 radiates the millimeter wave signal in the second radiation mode. As illustrated in FIG. 2, the first direction can be understood as the scanning direction of the millimeter wave module, and the second direction Y can be understood as the non-scanning direction of the millimeter wave module. In the millimeter wave module, each antenna array element is electrically connected to a phase shifter. In the millimeter wave module with 1×4 antenna array, by changing the phase distribution of the phase shifters connected at the ports of four antenna array element 31, it can perform a beam scanning of the millimeter wave module in one direction, but not in the other direction. For example, if a mobile phone is analogous to the millimeter wave module with 1×4 antenna array, a long-side direction of the mobile phone can be understood as the scanning direction, and a wide-side direction of the mobile phone is the non-scanning direction. A dimension of the millimeter wave module along the scanning direction satisfy that a dimension of each dual-polarized antenna array element 31 of the antenna array 30 along the scanning direction is not less than ½ of the working wavelength of the millimeter wave module. In an embodiment, the millimeter wave signal is radiated in the patch radiation mode of the antenna array 30 in the first direction (scanning direction) of the millimeter wave module, and in the substrate integrated waveguide radiation mode in the second direction (non-scanning direction) of the millimeter wave module, that is to say, the first radiation mode is the patch radiation mode, the second radiation mode is the substrate integrated waveguide radiation mode. Two different radiation modes with the first radiation mode and the second radiation mode are used in two different directions with the first direction and the second direction to radiate millimeter wave signal to achieve dual polarization, to realize that the millimeter wave module has a second dimension thereof in the second direction less than a first dimension thereof in the first direction. There is no need that the millimeter wave module is to have a square shape. The resonant frequency of the antenna in the second direction is related to the dimension of the dual-polarized antenna array element, the distance among a metallized through hole, the dual-polarized antenna array element and a metal layer. In some embodiments, by adjusting the above parameters to ensure that the millimeter wave module radiates millimeter wave signal at the same frequency in the first direction and the second direction to achieve dual polarization, the dimension of the millimeter wave module in the non-scanning direction can be reduced.

In some embodiments, each dual-polarized antenna array element radiates millimeter wave signal in two different radiation modes, so that it is not necessary to set the millimeter wave module to be a square shape to ensure that the dual-polarized antenna array element radiates millimeter wave signal at the same frequency in the first direction and the second direction to achieve dual polarization, which can reduce the dimension of the millimeter wave module.

Figure 3:
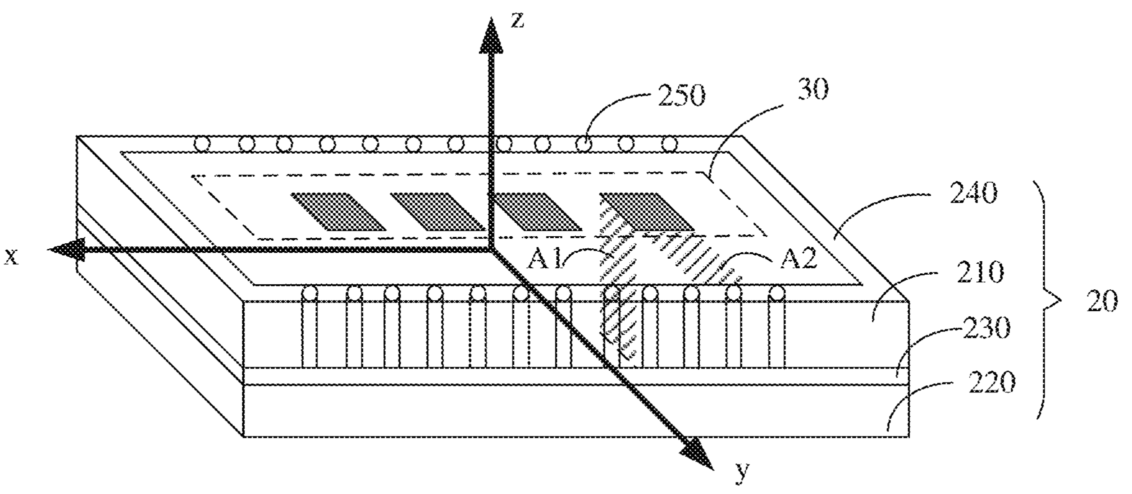
FIG. 3 is a schematic diagram of the coordinates of a millimeter wave module according to an embodiment of the present disclosure.

As illustrated in FIG. 3, according to an embodiment, the antenna substrate 20 includes a top layer 210 and a bottom layer 220 arranged in a multi-layered manner, and an antenna ground layer 230 arranged between the top layer 210 and the bottom layer 220. The top layer 210 and the antenna ground layer 230 are both covered with a metal layer 240. The top layer 210 is provided with a plurality of metallized through holes 250 penetrating the antenna substrate 20 and the metal layer 240.

According to an embodiment, the antenna substrate 20 may be a multilayer printed circuit board (PCB) integrated by HDI (High Density Interconnection) process. For example, the antenna substrate 20 can include a core layer, and a PP (Prepreg) layer respectively superimposed on both sides of the core layer, and a metal layer 240 is plated on each PP layer and the core layer. In some embodiments, the core layer is the base material. The PP layer is the prepreg which is arranged between two copper layers, which serves to isolate and bond the two copper layers. The metal layer 240 may be a copper layer, a tin layer, a lead-tin alloy layer, a tin-copper alloy layer, etc.

The antenna substrate 20 includes the top layer 210 and the bottom layer 220 arranged in a multi-layered manner. The top layer 210 can be used to dispose the antenna array. The top layer 210 is plated with the metal layer 240. The top layer 210 is provided with the metallized through holes 250 through the antenna substrate 20 and the metal layer 240. The bottom layer 220 can be configured to connect to a radio frequency unit. The antenna substrate 20 further includes the antenna ground layer 230 arranged between the top layer 210 and the bottom layer 220. The metallized through hole 250 is used to connect the top layer 210 and the antenna ground layer 230 of the antenna substrate 20, so that the ground plane is lifted to the top layer 210 of the antenna substrate 20 by the metallized through hole 250.

The metal layer 240 may be a copper layer, a tin layer, a lead-tin alloy layer, a tin-copper alloy layer, etc. The metal layer 240 of the top layer 210 may only be provided on the peripheral edge area, for example, may be a metal ring. The plurality of metal through holes are arranged on the metal ring. The plurality of metallized through holes 250 are connected as a whole through the metal ring. The metal ring can be realized by punching air holes and then coating with metal. The metallized through holes 250 can replace the metal sidewall of the traditional waveguide mode to realize the wave guiding effect. The diameters of the plurality of metallized through holes may all be the same. The distances between the centers of any two adjacent metallized through holes 250 are equal.

Figure 4:
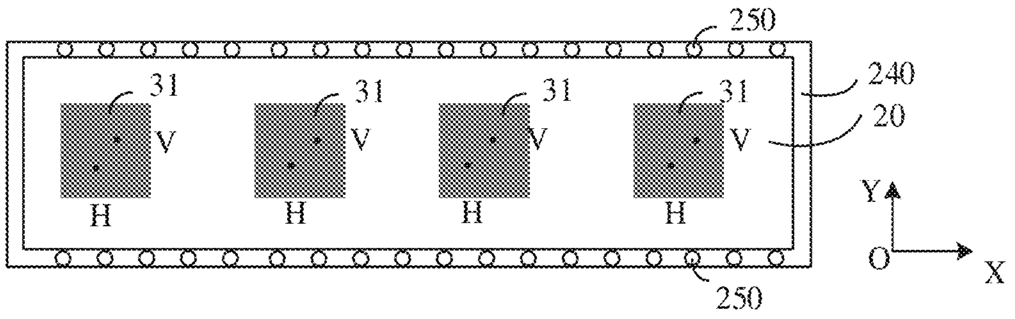
FIG. 4 is a schematic top view of a millimeter wave module according to an embodiment of the present disclosure.

The antenna array 30 is arranged on the top layer 210. The antenna array 30 includes a plurality of dual-polarized antenna array elements 31 for radiating millimeter wave signal. When feeding in the first direction X, the dual-polarized antenna array element 31 radiates the millimeter wave signal through a first gap A1. When feeding in the second direction Y, the dual-polarized antenna array element 31 radiates the millimeter wave signal through a second gap A2. According to an embodiment, as illustrated in FIG. 4, a first feeding point V and a second feeding point H are provided on each dual-polarized antenna array element 31. The first feeding point V radiates the millimeter wave signal through the first gap between the dual-polarized antenna array element 31 and the antenna ground layer 230. The second feeding point H radiates the millimeter wave signal through the second gap between the dual-polarized antenna array element 31 and the metallized through holes 250. The first gap A1 can be an area or space which spaces apart the dual-polarized antenna array element 31 and the antenna ground 230. The second gap A2 can be an area or space which spaces apart the dual-polarized antenna array element 31 and the metallized through holes 250. For example, when the antenna array element 31 is fed in the first direction X through the first feeding point V, the electric field is mainly distributed in the interval space (along the Z direction) between the radiating edge of the antenna array element 31 and the antenna ground 230. The interval space can be equivalent to the first gap. The first feeding point V radiates the millimeter wave signal by the interval space along the Z direction. Similarly, when the antenna array element 31 is fed in the second direction Y through the second feeding point H, the electric field is mainly distributed in the interval area (along the Y direction) between the radiating edge of the antenna array element 31 and the metallized through holes 250. The interval area can be equivalent to the second gap. The second feeding point H radiates the millimeter wave signal by the interval area along the Y direction.

The antenna array 30 may be an antenna that processes the millimeter wave signal, and may be implemented as a phase-controlled antenna array 30. The antenna array 30 for supporting millimeter wave communication may be an antenna array 30 composed of a patch antenna, a dipole antenna, a Yagi antenna, a beam antenna or other suitable antenna elements. The specific type of the antenna array 30 is not further limited in the embodiments of the present disclosure. It is sufficient to transmit and receive millimeter wave signal.

The antenna array 30 is arranged on the top layer 210. The antenna array 30 includes a plurality of dual-polarized antenna array elements 31 for radiating the millimeter wave signal. The antenna array 30 may be composed of a plurality of dual-polarized antenna array elements 31 arranged periodically. The number of the dual-polarized antenna array element 31 is determined according to specific scanning angle and gain requirements, and is not limited. The dual-polarized antenna array element 31 may be one of a square patch antenna, a loop patch antenna, an elliptical patch antenna, and a cross-shaped patch antenna. In the illustrated embodiment, two-dimensional scanning is taken as an example, and the antenna array 30 is arranged in a 1×4 rectangle. The 1×4 antenna array 30 has a higher spatial coverage, and the structure can be placed on the left and right sides of a mobile phone. If a full-space, three-dimensional scanning is performed, the antenna array 30 can be rotated to be symmetrically arranged. The shape and the position can be changed appropriately.

According to an embodiment, as illustrated in FIG. 4, the antenna array 30 includes a plurality of dual-polarized antenna array elements 31. Each dual-polarized antenna array element 31 is a rectangular patch antenna. The rectangular patch antenna may include a vertical polarization feeding point V and a horizontal polarization feeding point H. The position of the vertically polarized feeding point V and the horizontally polarized feeding point H are determined according to debugging, which can be implemented by matching the impedance of the position of the feeding point to 50Ω. For example, the antenna array 30 may include four dual-polarized antenna array elements 31. The four dual-polarized antenna array elements 31 are linearly arranged, wherein the vertical polarization feeding point V and the horizontal polarization feeding point H of each dual-polarized antenna array element 31 can be understood as two independent feeding points. In other words, the dual-polarized antenna array element 31 includes two sets of different feeding points (V, H).

The first feeding point V radiates the millimeter wave signal through the first gap between the antenna array 30 and the antenna ground 230. The second feeding point H radiates the millimeter wave signal through the second gap between the antenna array 30 and the metallized through hole 250. Specifically, a first slot are provided on both sides of the antenna substrate 20. The first feeding point V can radiate the millimeter wave signal by the first slots. The metallized through holes 250 connects the antenna ground layer 230 and the top layer 210 which the dual-polarized antenna array elements 31 are located. The electric field can be distributed in the second gap between each dual-polarized antenna array element 31 and the metallized through hole 250. Therefore, the second feeding point H can radiate the millimeter wave signal through the second gap.

In the illustrated embodiment, the millimeter wave antenna device includes an antenna substrate 20. The antenna substrate 20 includes a top layer 210 and a bottom layer 220 arranged in a multi-layered manner, and an antenna ground layer 230 arranged between the top layer 210 and the bottom layer 220. Both of the top layer 210 and the antenna ground layer 230 are covered with a metal layer 240. The top layer 210 is provided with a plurality of metallized through holes 250 that penetrates the antenna substrate 20 and the metal layer 240. The antenna array 30, which is provided on the top layer 210, includes a plurality of dual-polarized antenna array elements 31 for radiating the millimeter wave signal. Each dual-polarized antenna array element 31 is provided with a first feeding point V and a second feeding point H. The first feeding point V radiates the millimeter wave signal through the first gap between the antenna array 30 and the antenna ground 230. The second feeding point H radiates the millimeter wave signal through the second gap between the antenna array 30 and the metallized through hole 250. Each dual-polarized antenna array element radiates the millimeter wave signal in two different radiation modes, so that it is not necessary to set the millimeter wave module to be a square shape to ensure that the dual-polarized antenna array element radiates the millimeter wave signal at the same frequency in the first direction and the second direction to achieve dual polarization, which can reduce the dimension of the millimeter wave module.

According to an embodiment, referring to FIG. 4, a plurality of metallized through holes 250 are provided on the antenna substrate 20 along the first direction X. The plurality of metallized through holes 250 are provided at intervals on two sides of the antenna array 30, to form a substrate integrated waveguide between the top layer 210 and the antenna ground layer 230 of the antenna substrate 20. The second gap is located between the dual-polarized antenna array 30 and the substrate integrated waveguide, so that when the dual-polarized antenna array element 31 is fed in the second direction Y, the dual-polarized antenna array element 31 radiates the millimeter wave signal through the second gap.

Substrate integrated waveguide (SIW) is an approximately closed waveguide structure that can be integrated in the antenna substrate 20. By arranging two rows of periodic metallized through holes 250 at a certain interval in the antenna substrate 20, an alternative structure of smooth sidewall of the waveguide can be formed, thereby enclosing together with the top layer 210 of the antenna substrate 20 and the antenna ground layer 230 to form a quasi-closed waveguide structure through which the millimeter wave signal are radiated. More specifically, when the dual-polarized antenna array element 31 is fed in the second direction Y, the millimeter wave signal is radiated through the second gap between the dual-polarized antenna array element 31 and the substrate integrated waveguide.

According to an embodiment, the dimension of the antenna substrate 20 along the second direction Y is 0.2-1 mm. The dimension of the antenna substrate 20 along the second direction Y is smaller than the dimension of the antenna substrate 20 along the first direction X. When the millimeter-wave module is fed in the Y direction, the dual-polarized antenna array element 31 is closer to the metallized through holes 250 in the second direction Y, so that the electric field can be distributed in the second gap between the dual-polarized antenna array element 31 and the substrate integrated waveguide, so as to enable that the dual-polarized antenna array element 31 radiates the millimeter wave signal out through the second gap. The resonant frequency of the millimeter wave signal radiated by the millimeter wave module in the second direction Y may be related to the dimension of the dual-polarized antenna array element 31, the dimension of the metallized through holes 250, and the distance between the dual-polarized antenna array element 31 and the metal layer. By adjusting the above parameters, it can be ensured that the millimeter wave module radiates the millimeter wave signal at the same resonant frequency in the first direction and the second direction to achieve dual polarization, so there is no need to ensure the symmetry of the dimensions along the first direction and the second direction, thereby reducing the dimension of the millimeter wave module along the non-scanning direction.

According to an embodiment, the interval between the plurality of metallized through holes 250 is less than ¼ of the working wavelength of the millimeter wave module. It can be understood that the interval between the plurality of metallized through holes 250 is the spacing between the respective center of two adjacent metallized through holes 250. By setting the interval between the plurality of metallized through holes 250 to be less than ¼ of the working wavelength of the millimeter wave module, a quasi-closed substrate integrated waveguide resonant cavity can be formed on the antenna substrate 20, thereby forming and improving the radiation performance of the millimeter wave module.

Figure 5:
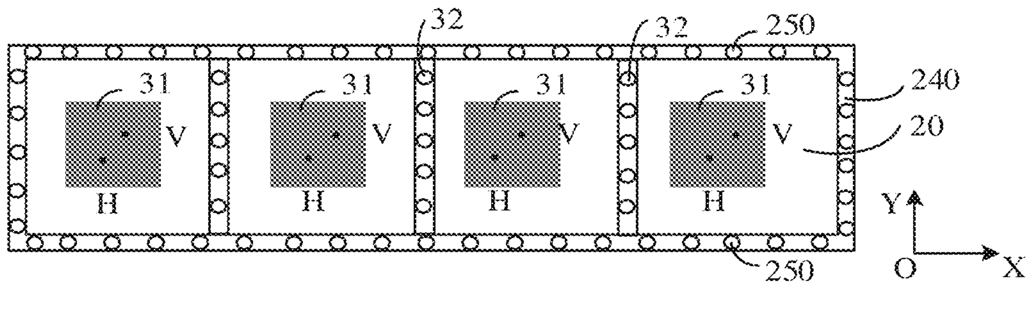
FIG. 5 is a schematic top view of a millimeter wave module according to another embodiment of the present disclosure.

According to an embodiment, as illustrated in FIG. 5, a plurality of dual-polarized antenna array elements 31 are arranged in a linear array along the first direction. An isolation grid 32 is provided between two adjacent dual-polarized antenna array elements 31, to adjust the isolation between two adjacent dual-polarized antenna array elements 31. The isolation grid 32 can be provided on the metal layer 240 and penetrates to the antenna ground layer 230 of the antenna substrate 20, so as to prevent the millimeter wave signals radiated by two adjacent dual-polarized antenna elements 31 from interacting with each other, improving the isolation between two adjacent dual-polarized antenna array elements 31.

Figure 6:
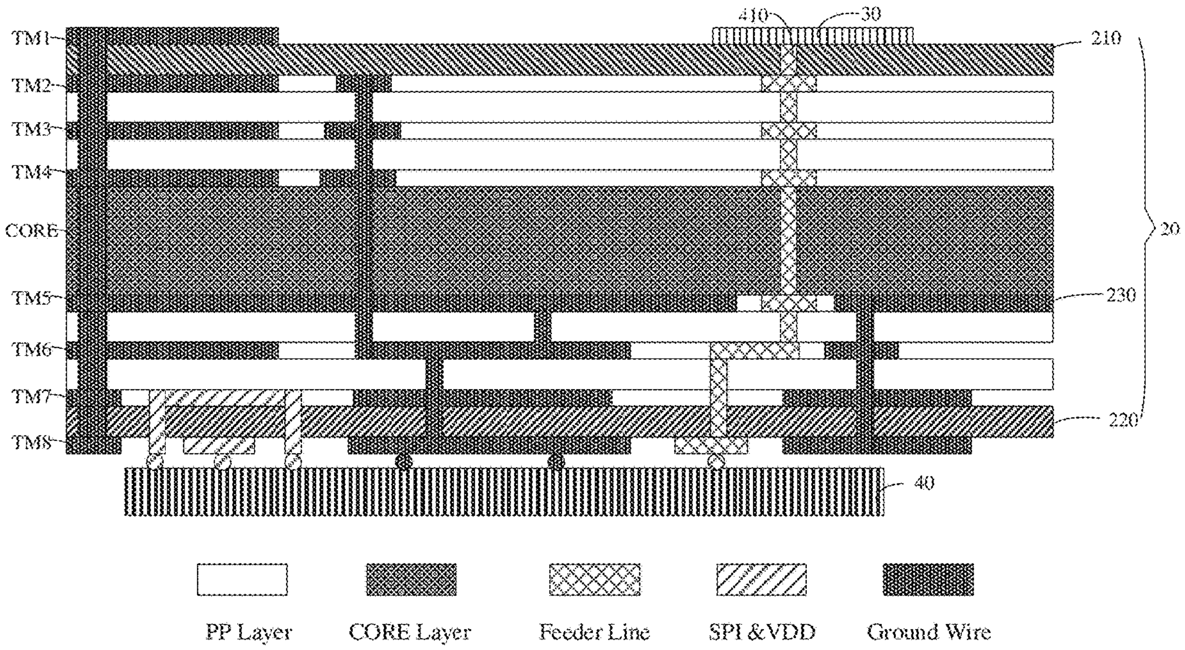
FIG. 6 is a schematic cross-sectional view of a millimeter wave module according to an embodiment of the present disclosure.

According to an embodiment, as illustrated in FIG. 6, the millimeter wave module further includes a radio frequency unit 40. The radio frequency unit 40 is provided at the side of the bottom layer 220 facing away from the antenna array 30. The first feeding point V and the second feeding point H are connected to the radio frequency unit 40 by a feeder line 410 passing through the antenna substrate 20, so as to feed the current signal to the radiating unit, realizing the transmission and reception of the millimeter wave signal.

According to an embodiment, as illustrated in FIG. 6, the antenna substrate 20 is implemented by a PCB stack structure of an 8-layer millimeter-wave package antenna integrated by an HDI (High Density Interconnection) process. TM1~TM5 are all labeled as the same layer of the antenna part. The antenna array 30 is located on the TM1 layer. TM6~TM7 layers are the feeding network and the copper layer of the control line wiring of the millimeter wave module. The radio frequency unit is welded on the TM8 layer.

PP1~PP6 are prepregs, which are located between the two copper layers to isolate and bond the two copper layers. CORE is the basic material for making printed board, and is also called as core board, which has a certain degree of hardness and thickness. The core board can be clad with copper on both sides.

According to an embodiment of the present disclosure, an electronic device is further provided. The electronic device includes a housing and the millimeter wave module according to any of the above embodiments. The millimeter wave module is accommodated in the housing.

Figure 7:
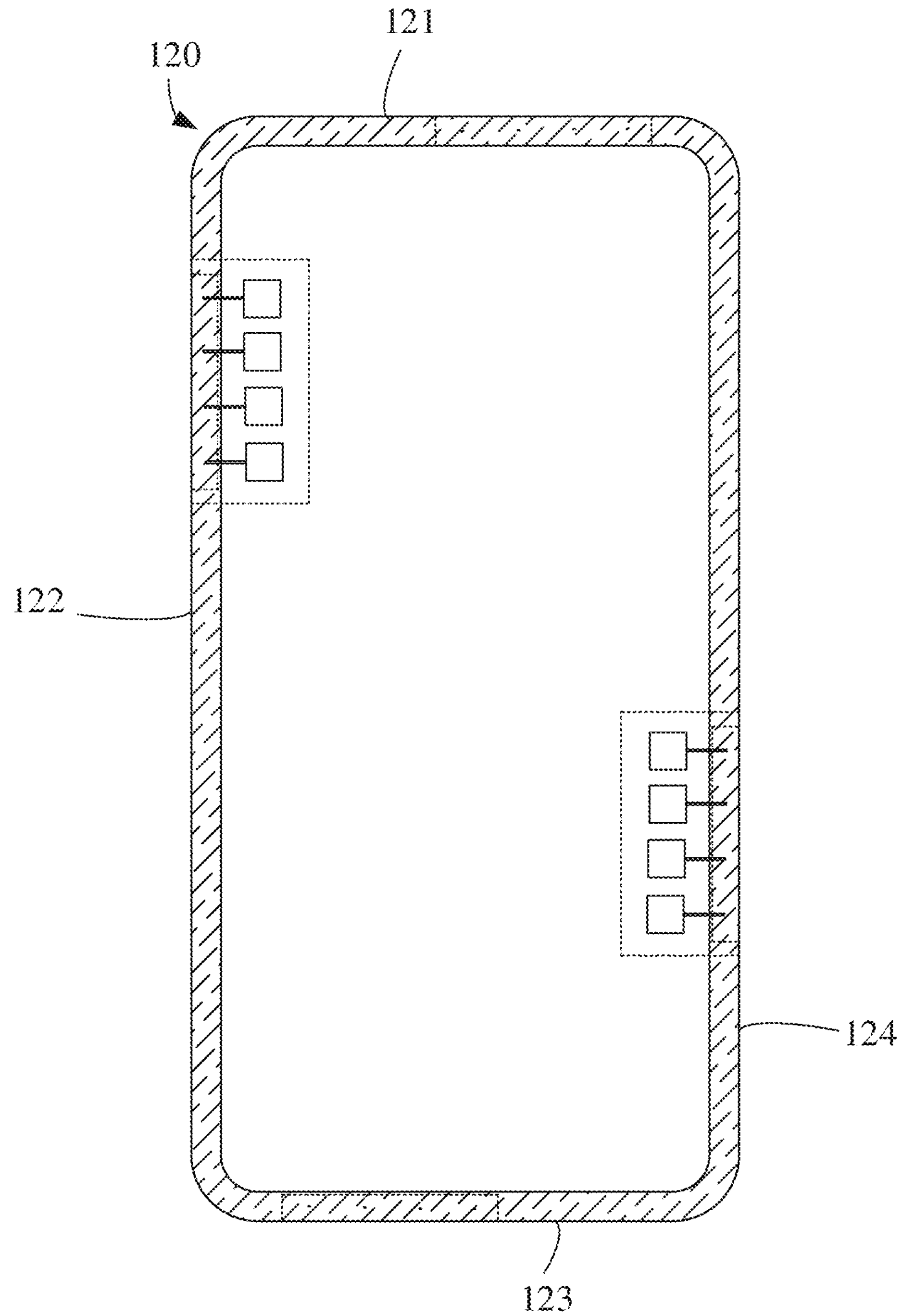
FIG. 7 is a front view of the housing assembly of the electronic device shown in FIG. 1 according to another embodiment of the present disclosure.

According to an embodiment, as illustrated in FIG. 7, the electronic device includes a plurality of millimeter wave modules. The plurality of millimeter wave modules are distributed on different sides of the housing. For example, the housing 120 includes a first side 121 and a third side 123 facing to each other, and a second side 122 and a fourth side 124 facing to each other. The second side 122 is connected between one end of the first side 121 and the third side 123. The fourth side 124 is connected between the other end of the first side 121 and the third side 123. The plurality of millimeter wave modules are respectively distributed at least two of the first side 121, the second side 122, the third side 123, and the fourth side 124. When there are two millimeter wave modules, these two millimeter wave modules can be respectively located on the second side 122 and the fourth side 124, so that the overall size of the millimeter wave module is reduced in the dimension of the non-scanning direction. It is possible to place the millimeter wave module on both sides of electronic equipment.

The electronic device with the millimeter wave module of any of the above embodiments can be applied for the transmission and reception of the millimeter wave signal for 5G communication. By two different feeding modes, the dimension of the millimeter wave module in the non-scanning direction can be reduced, thereby reducing the space occupied by the millimeter wave module in the electronic device.

The electronic device can be a mobile phone, a tablet computer, a laptop computer, a handheld computer, a mobile Internet device (MID), a wearable device (such as a smart watch, a smart bracelet, a pedometer, etc.) or other communication module with antenna.

Figure 8:
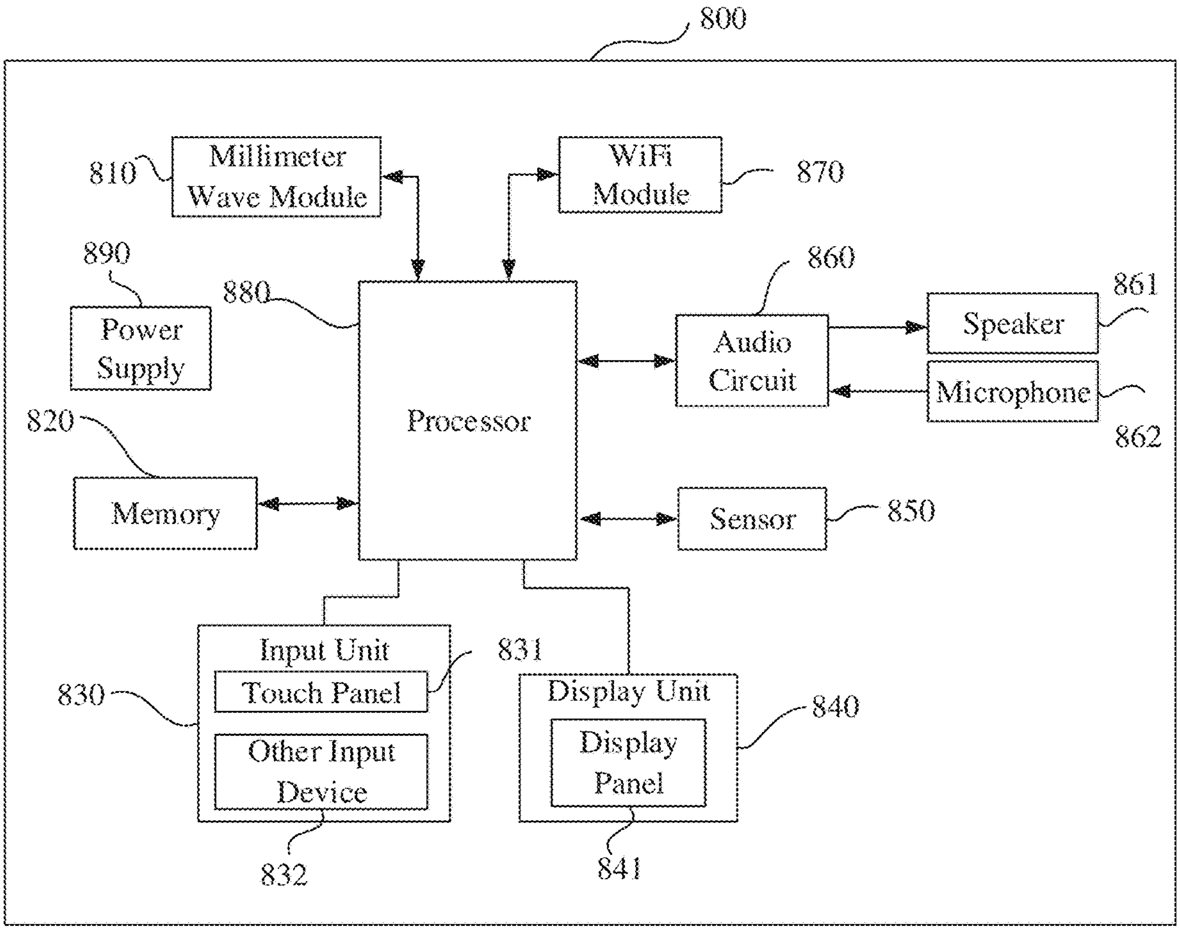
FIG. 8 is a block diagram of a part of the structure of a mobile phone related to an electronic device according to an embodiment of the present disclosure.

According to an embodiment of the present disclosure, an electronic device is further provided. As illustrated in FIG. 8, for the purpose of illustration, only those parts related to the embodiments of the present disclosure are shown. For specific technical details that are not disclosed, please refer to the other part of the embodiments of the present disclosure. The electronic device can be any terminal device including a mobile phone, a tablet computer, a PDA (Personal Digital Assistant), a POS (Point of Sales), in-vehicle computer, wearable device, etc. Take the electronic device as a mobile phone as an example:

FIG. 8 is a block diagram of a part of the structure of a mobile phone related to an electronic device according to an embodiment of the present disclosure. Referring to FIG. 8, the mobile phone includes a millimeter wave module 810, a memory 820, an input unit 830, a display unit 840, a sensor 850, an audio circuit 860, a wireless fidelity (WiFi) module 870, a processor 880, a power supply 890 and other components. Person skilled in the art can understand that a mobile phone will not be limited to the structure of the mobile phone shown in FIG. 8, and may include more or fewer components than those shown in the figure, or include a combination of certain components, or have a different component arrangement.

The millimeter wave module 810 can be used for receiving and transmitting signal during receiving and transmitting message or calls. The millimeter wave module 810 can receive the downlink information of the base station and send it to the processor 880 for processing. The millimeter wave module 810 can also send uplink data to the base station. Generally, the millimeter wave module includes, but is not limited to, an antenna, at least one amplifier, a transceiver, a coupler, a low noise amplifier (LNA), a duplexer, and other components. In addition, the millimeter wave module 810 can also communicate with other device through wireless communication and network. The foregoing wireless communication can use any communication standard or protocol, including but not limited to: Global System of Mobile Communication (GSM), General Packet Radio Service (GPRS), Code Division Multiple Access (CDMA), Wideband Code Division Multiple Access (WCDMA), Long Term Evolution (LTE), Email, Short Messaging Service (SMS), etc.

The memory 820 may be used to store software programs and modules. The processor 880 performs various functional applications and data processing of the mobile phone by running the software programs and modules stored in the memory 820. The memory 820 may mainly include a program storage area and a data storage area. The program storage area may store an operating system, at least one application program required by a function (such as an application program for a sound playback function, an application program for an image playback function, etc.), etc. The data storage area can store data (such as audio data, address book, etc.) created during the use of the mobile phone. In addition, the memory 820 may include a high-speed random access memory, or may include a non-volatile memory, such as at least one magnetic disk memory, or a flash memory, or may include other volatile solid-state memory.

The input unit 830 may be used to receive inputted number or character information, and to generate key signal input related to user settings as well as function control of the mobile phone 800. Specifically, the input unit 830 may include a touch panel 831 and other input device 832. The touch panel 831, which may also be called a touch screen, can collect the user's touch operation on or near the touch panel 831 (for example, the user's operation on or near the touch panel 831 using any suitable object or attachment such as a finger, stylus, etc.), and drive the corresponding connection device according to a predetermined program. According to one embodiment, the touch panel 831 may include two parts: a touch detection device and a touch controller. The touch detection device detects the user's touch orientation, and detects the signal brought by the touch operation, and transmits the signal to the touch controller. The touch controller receives the touch information from the touch detection device, converts it into a touch coordinate, and then sends the touch coordinate to the processor 880, and can receive the commands sent by the processor 880 and execute them. In addition, the touch panel 831 can be implemented by a plurality of types such as resistive, capacitive, infrared, and surface acoustic wave. In addition to the touch panel 831, the input unit 830 may further include other input device 832. More specifically, the other input device 832 may include, but is not limited to, one or more of a physical keyboard, a function button (such as a volume control button, a switch button, etc.).

The display unit 840 may be used to display information input by the user or information provided to the user, and various menus of the mobile phone. The display unit 840 may include a display panel 841. According to an embodiment, the display panel 841 may be configured in the form of a liquid crystal display (LCD), an organic light-emitting diode (OLED), etc. According to an embodiment, the touch panel 831 can overlay the display panel 841. When the touch panel 831 detects a touch operation on or near the touch panel, the touch panel 831 transmits the touch information to the processor 880 to determine the type of the touch event, and then the processor 880 provides a corresponding visual output on the display panel 841 according to the type of the touch event. Although the touch panel 831 and the display panel 841 are used as two separate components to implement the input and output functions of the mobile phone in FIG. 8, the touch panel 831 and the display panel 841 can be integrated in some other embodiments to realize the input and output functions of the mobile phone.

The mobile phone 800 may further include at least one sensor 850, such as a light sensor, a motion sensor, and other sensors. More specifically, the light sensor can include an ambient light sensor and a proximity sensor. The ambient light sensor can adjust the brightness of the display panel 841 according to the brightness of the ambient light. The proximity sensor can close the display panel 841 and/or backlight when the mobile phone is moved to the ear. The motion sensor can include an acceleration sensor. The acceleration sensors can detect the magnitude of acceleration along each direction, and can detect the magnitude and direction of the gravity when the mobile phone remains stationary, and can be used for an application for identifying a mobile phone's posture (such as horizontal and vertical screen switching), and a vibration recognition-related function (such as pedometer, tapping), etc. In addition, the mobile phone may also be configured with one or more other sensors such as gyroscope, a barometer, a hygrometer, a thermometer, an infrared sensor, etc.

The audio circuit 860, the speaker 861 and the microphone 862 can provide an audio interface between the user and the mobile phone. The audio circuit 860 can transmit an electrical signal converted from the received audio data to the speaker 861, and the speaker 861 converts the electrical signal into a sound signal for output. On the other hand, the microphone 862 converts the collected sound signal into an electric signal, and the audio circuit 860 receives and converts the electric signal into an audio data, and then outputs the audio data to the processor 880 for processing. After being processed, the audio data can be sent to another mobile phone by the millimeter wave module 810, or be output to the memory 820 for subsequent processing.

WiFi is a short-range wireless transmission technology. The mobile phones can help user send and receive an email, browse a web page, and access a streaming media through the WiFi module 870. The WiFi module can provide user with a wireless broadband Internet access. Although FIG. 8 shows the WiFi module 870, it can be understood that it is not a necessary component of the mobile phone 800 and can be omitted as needed.

The processor 880 is a control center of the mobile phone. The processor connects various parts of the entire mobile phone by various interfaces and lines, and performs various functions of the phone and processes data by running or executing software programs and/or modules stored in memory 820, as well as calling data stored in memory 820, thereby providing an overall monitoring of the mobile phone. According to an embodiment, the processor 880 may include one or more processing units. According to an embodiment, the processor 880 may integrate an application processor and a modem processor, wherein the application processor mainly processes an operating system, a user interface, and an application program, etc., and the modem processor mainly processes a wireless communication. In some embodiments, the foregoing modem processor may not be integrated into the processor 880.

The mobile phone 800 may further include a power source 890 (such as a battery) for supplying power to various components. Preferably, the power source may be logically connected to the processor 880 through a power management system, so as to realize functions such as managing charging and discharging, and power consumption management by the power management system.

According to an embodiment, the mobile phone 800 may further include a camera, a Bluetooth module, etc.

Any reference to memory, storage, database, or other media in the present disclosure may include a non-volatile and/or volatile memory. The non-volatile memory may include a read only memory (ROM), a programmable ROM (PROM), an electrically programmable ROM (EPROM), an electrically erasable programmable ROM (EEPROM), or a flash memory. The volatile memory may include a random access memory (RAM), which can act as an external cache memory. As an illustration and not a limitation, RAM is available in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchronous Link (Synchlink) DRAM (SLDRAM), a Rambus direct RAM (RDRAM), a direct Rambus dynamic RAM (DRDRAM), and a Rambus dynamic RAM (RDRAM).

The technical features of the above embodiments can be combined in any ways. In order to make the description concise, the specification does not describe all possible combinations of the various technical features in the above embodiments. However, as long as there is no contradiction in the combination of these technical features, all should be considered to fall into the scope of the specification.

The above embodiments only express several embodiments of the present disclosure, and the descriptions are relatively specific and detailed, but they cannot be understood as a limitation to the protection scope of the present disclosure. It should be noted that for person skilled in the art, several modifications and improvements can be made without departing from the conception of the present disclosure, and these all fall into the protection scope of the present disclosure. Therefore, the protection scope of the present disclosure shall be subject to the attached claims.

According to one aspect of the present disclosure, a millimeter wave module comprises an antenna substrate, comprising a first direction and a second direction perpendicular to each other, a dimension of the antenna substrate along the first direction being larger than a dimension of the antenna substrate along the second direction; and an antenna array being located on the antenna substrate, the antenna array comprising a plurality of dual-polarized antenna array elements for radiating millimeter wave signal, at least one of the dual-polarized antenna array elements being configured to radiate the millimeter wave signal in a first radiation mode when being fed in the first direction, and radiate the millimeter wave signal in a second radiation mode when being fed in the second direction.

In some embodiments, the antenna array is in a 1×4 rectangular arrangement.

In some embodiments, the first radiation mode comprises a slot radiation mode, the second radiation pattern comprises a substrate integrated waveguide radiation mode.

In some embodiments, the first direction is a scanning direction of the millimeter wave module, and the second direction is a non-scanning direction of the millimeter wave module.

In some embodiments, the antenna substrate comprises a top layer and a bottom layer provided opposite to each other, and an antenna ground layer provided between the top layer and the bottom layer, the top layer and the antenna ground layer are covered with a metal layer, the top layer is provided with a plurality of metallized through holes penetrating the antenna substrate and the metal layer; and wherein the antenna array is located on the top layer, a first gap is provided between the antenna array and the antenna ground layer, a second gap is provided between the antenna array and the metallized through holes, when the at least one of the dual-polarized antenna array elements is fed in the first direction, the millimeter wave signal is radiated through the first gap, when the at least one of the dual-polarized antenna array elements is fed in the second direction, the millimeter wave signal is radiated through the second gap.

In some embodiments, a first feeding point and a second feeding point are provided on each dual-polarized antenna array element; wherein, the first feeding point radiates the millimeter wave signal through the first gap between the dual-polarized antenna array element and the antenna ground layer; the second feeding point radiates the millimeter wave signal through the second gap between the dual-polarized antenna array element and the metallized through hole.

In some embodiments, the antenna substrate is implemented by a multi-layer printed circuit board integrated with a high density interconnection process.

In some embodiments, the metal layer on the top layer is provided on the peripheral edge area to form a metal ring, and the plurality of the metallized through holes are connected as a whole through the metal ring.

In some embodiments, the diameters of the plurality of the metallized through holes are the same, and the distances between the centers of any two adjacent metallized through holes are equal.

In some embodiments, the plurality of the metallized through holes are provided on the antenna substrate along the first direction, the plurality of the metallized through holes are provided at intervals on two sides of the antenna array, to form a substrate integrated waveguide between the top layer and the antenna ground layer of the antenna substrate, the second gap is located between the dual-polarized antenna array and the substrate integrated waveguide, so that the millimeter wave signal is radiated through the second gap when the at least one of the dual-polarized antenna array elements is fed in the second direction.

In some embodiments, the interval between the plurality of metallized through holes is less than ¼ of the working wavelength of the millimeter wave module.

In some embodiments, the dimension of the antenna substrate along the second direction ranges from 0.2 mm to 1 mm.

In some embodiments, the at least one of the dual-polarized antenna array elements is selected from one of a square patch antenna, a loop patch antenna, an elliptical patch antenna, and a cross-shaped patch antenna.

In some embodiments, the plurality of the dual-polarized antenna array elements are arranged in a linear array along the first direction, an isolation grid is provided between two adjacent dual-polarized antenna array elements, for adjusting an isolation between two adjacent dual-polarized antenna array elements.

In some embodiments, the millimeter wave module further comprises a radio frequency unit, the radio frequency unit is provided at a side of the bottom layer facing away from the dual-polarized antenna array elements, a first feeding point and a second feeding point are provided on each of the dual-polarized antenna array elements, the first feeding point and the second feeding point are connected to the radio frequency unit by a feeder line passing through the antenna substrate.

According to another aspect of the present disclosure, an electronic device, comprising a housing and a millimeter wave module; the millimeter wave module being accommodated in the housing; the millimeter wave module comprising: an antenna substrate, comprising a first direction and a second direction perpendicular to each other, a dimension of the antenna substrate along the first direction being larger than a dimension of the antenna substrate along the second direction; and an antenna array being located on the antenna substrate, the antenna array comprising a plurality of dual-polarized antenna array elements for radiating millimeter wave signal, at least one of the dual-polarized antenna array elements being configured to radiate the millimeter wave signal in a first radiation mode when being fed in the first direction, and radiate the millimeter wave signal in a second radiation mode when being fed in the second direction.

In some embodiments, the antenna substrate comprises a top layer and a bottom layer provided opposite to each other, and an antenna ground layer provided between the top layer and the bottom layer, the top layer and the antenna ground layer are covered with a metal layer, the top layer is provided with a plurality of metallized through holes penetrating the antenna substrate and the metal layer; and wherein the antenna array is provided on the top layer, a first gap is provided between the antenna array and the antenna ground layer, a second gap is provided between the antenna array and the metallized through holes, when the at least one of the dual-polarized antenna array elements is fed in the first direction, the millimeter wave signal is radiated through the first gap, when the at least one of the dual-polarized antenna array elements is fed in the second direction, the millimeter wave signal is radiated through the second gap.

In some embodiments, the plurality of the metallized through holes are provided on the antenna substrate along the first direction, the plurality of the metallized through holes are provided at intervals on two sides of the antenna array, to form a substrate integrated waveguide between the top layer and the antenna ground layer of the antenna substrate, the second gap is located between the dual-polarized antenna array and the substrate integrated waveguide, so that the millimeter wave signal is radiated through the second gap when the at least one of the dual-polarized antenna array elements is fed in the second direction.

In some embodiments, the interval between the plurality of metallized through holes is less than ¼ of the working wavelength of the millimeter wave module.

In some embodiments, the electronic device comprises a plurality of the millimeter wave modules; the housing comprises a first side and a third side arranged opposite to each other, and a second side and a fourth side arranged opposite to each other, the second side is connected between one end of the first side and the third side, the fourth side is connected between the other end of the first side and the third side; the plurality of millimeter wave modules are distributed on at least two of the first side, the second side, the third side, and the fourth side.

What is claimed is:

1. A millimeter wave module, comprising:

an antenna substrate; and an antenna array being located on the antenna substrate, the antenna array comprising a plurality of dual-polarized antenna array elements for radiating millimeter wave signal, at least one of the dual-polarized antenna array elements being configured to radiate the millimeter wave signal in a first radiation mode when being fed in a first direction of the antenna substrate, and radiate the millimeter wave signal in a second radiation mode when being fed in a second direction of the antenna substrate, the first radiation mode being different from the second radiation mode, the first direction being perpendicular to the second direction, wherein the first radiation mode comprises a path radiation mode, the second radiation-pattern-mode comprises a substrate integrated waveguide radiation mode, and that the first and second radiation modes are separate but not stand-alone options.

2. The millimeter wave module of claim 1, wherein the antenna array is in a 1×4 rectangular arrangement.

3. The millimeter wave module of claim 1, wherein the first direction is a scanning direction of the millimeter wave module, the second direction is a non-scanning direction of the millimeter wave module.

4. The millimeter wave module of claim 1, wherein the antenna substrate comprises a top layer and a bottom layer provided in a multi-layered manner, and an antenna ground layer provided between the top layer and the bottom layer, the top layer and the antenna ground layer are covered with a metal layer, the top layer is provided with a plurality of metallized through holes penetrating the antenna substrate and the metal layer; and wherein the antenna array is located on the top layer, a first gap is provided between the antenna array and the antenna ground layer, a second gap is provided between the antenna array and the metallized through holes, when the at least one of the dual-polarized antenna array elements is fed in the first direction, the millimeter wave signal is radiated through the first gap, when the at least one of the dual-polarized antenna array elements is fed in the second direction, the millimeter wave signal is radiated through the second gap.

5. The millimeter wave module of claim 4, wherein a first feeding point and a second feeding point are provided on each of the dual-polarized antenna array elements; wherein, the first feeding point radiates the millimeter wave signal through the first gap between the dual-polarized antenna array elements and the antenna ground layer; the second feeding point radiates the millimeter wave signal through the second gap between the dual-polarized antenna array elements and the metallized through holes.

6. The millimeter wave module of claim 4, wherein the antenna substrate is implemented by a multi-layer printed circuit board integrated with a high density interconnection process.

7. The millimeter wave module of claim 4, wherein the metal layer on the top layer is provided on the peripheral edge area to form a metal ring, the plurality of the metallized through holes are connected as a whole through the metal ring.

8. The millimeter wave module of claim 4, wherein the diameters of the plurality of the metallized through holes are the same, the distances between the centers of any two adjacent metallized through holes are equal.

9. The millimeter wave module of claim 4, wherein the plurality of the metallized through holes are provided on the antenna substrate along the first direction, the plurality of the metallized through holes are provided at intervals on two sides of the antenna array, to form a substrate integrated waveguide between the top layer and the antenna ground layer of the antenna substrate, the second gap is located between the dual-polarized antenna array elements and the substrate integrated waveguide, so that the millimeter wave signal is radiated through the second gap when the at least one of the dual-polarized antenna array elements is fed in the second direction.

10. The millimeter wave module of claim 4, wherein the interval between two adjacent metallized through holes is less than ¼ of the working wavelength of the millimeter wave module.

11. The millimeter wave module of claim 1, wherein a dimension of the antenna substrate along the second direction ranges from 0.2 mm to 1 mm.

12. The millimeter wave module of claim 1, wherein the at least one of the dual-polarized antenna array elements is selected from one of a square patch antenna, a loop patch antenna, an elliptical patch antenna, and a cross-shaped patch antenna.

13. The millimeter wave module of claim 1, wherein the plurality of the dual-polarized antenna array elements are arranged in a linear array along the first direction, an isolation grid is provided between two adjacent dual-polarized antenna array elements, for adjusting an isolation between two adjacent dual-polarized antenna array elements.

14. The millimeter wave module of claim 4, wherein the millimeter wave module further comprises a radio frequency unit, the radio frequency unit is provided at a side of the bottom layer facing away from the dual-polarized antenna array elements, a first feeding point and a second feeding point are provided on each of the dual-polarized antenna array elements, the first feeding point and the second feeding point are connected to the radio frequency unit by a feeder line passing through the antenna substrate.

15. An electronic device, comprising a housing and a millimeter wave module; the millimeter wave module being accommodated in the housing; the millimeter wave module comprising:

an antenna substrate; and an antenna array being located on the antenna substrate, the antenna array comprising a plurality of dual-polarized antenna array elements for radiating millimeter wave signal, at least one of the dual-polarized antenna array elements being configured to radiate the millimeter wave signal in a first radiation mode when being fed in a first direction of the antenna substrate, and radiate the millimeter wave signal in a second radiation mode when being fed in a second direction of the antenna substrate, the first radiation mode being different from the second radiation mode, the first direction being perpendicular to the second direction, wherein the first radiation mode comprises a path radiation mode, the second radiation-pattern-mode comprises a substrate integrated waveguide radiation mode, and that the first and second radiation modes are separate but not stand-alone options.

16. The electronic device of claim 15, wherein the antenna substrate comprises a top layer and a bottom layer provided in a multi-layered manner, and an antenna ground layer provided between the top layer and the bottom layer, the top layer and the antenna ground layer are covered with a metal layer, the top layer is provided with a plurality of metallized through holes penetrating the antenna substrate and the metal layer; and wherein the antenna array is provided on the top layer, a first gap is provided between the antenna array and the antenna ground layer, a second gap is provided between the antenna array and the metallized through holes, when the at least one of the dual-polarized antenna array elements is fed in the first direction, the millimeter wave signal is radiated through the first gap, when the at least one of the dual-polarized antenna array elements is fed in the second direction, the millimeter wave signal is radiated through the second gap.

17. The electronic device of claim 15, wherein the plurality of the metallized through holes are provided on the antenna substrate along the first direction, the plurality of the metallized through holes are provided at intervals on two sides of the antenna array, to form a substrate integrated waveguide between the top layer and the antenna ground layer of the antenna substrate, the second gap is located between the dual-polarized antenna array elements and the substrate integrated waveguide, so that the millimeter wave signal is radiated through the second gap when the at least one of the dual-polarized antenna array elements is fed in the second direction.

18. The electronic device of claim 15, wherein the interval between two adjacent metallized through holes is less than ¼ of the working wavelength of the millimeter wave module.

19. The electronic device of claim 15, wherein the electronic device comprises a plurality of the millimeter wave modules;

the housing comprises a first side and a third side facing to each other, and a second side and a fourth side facing to each other, the second side is connected between one end of the first side and the third side, the fourth side is connected between the other end of the first side and the third side;

the plurality of millimeter wave modules are distributed on at least two of the first side, the second side, the third side, and the fourth side.

* * * * *